Aug. 1, 1967  H. C. SWIFT  3,333,660
PARKING BRAKE WITH AUTOMATIC ADJUSTER
Filed March 21, 1966
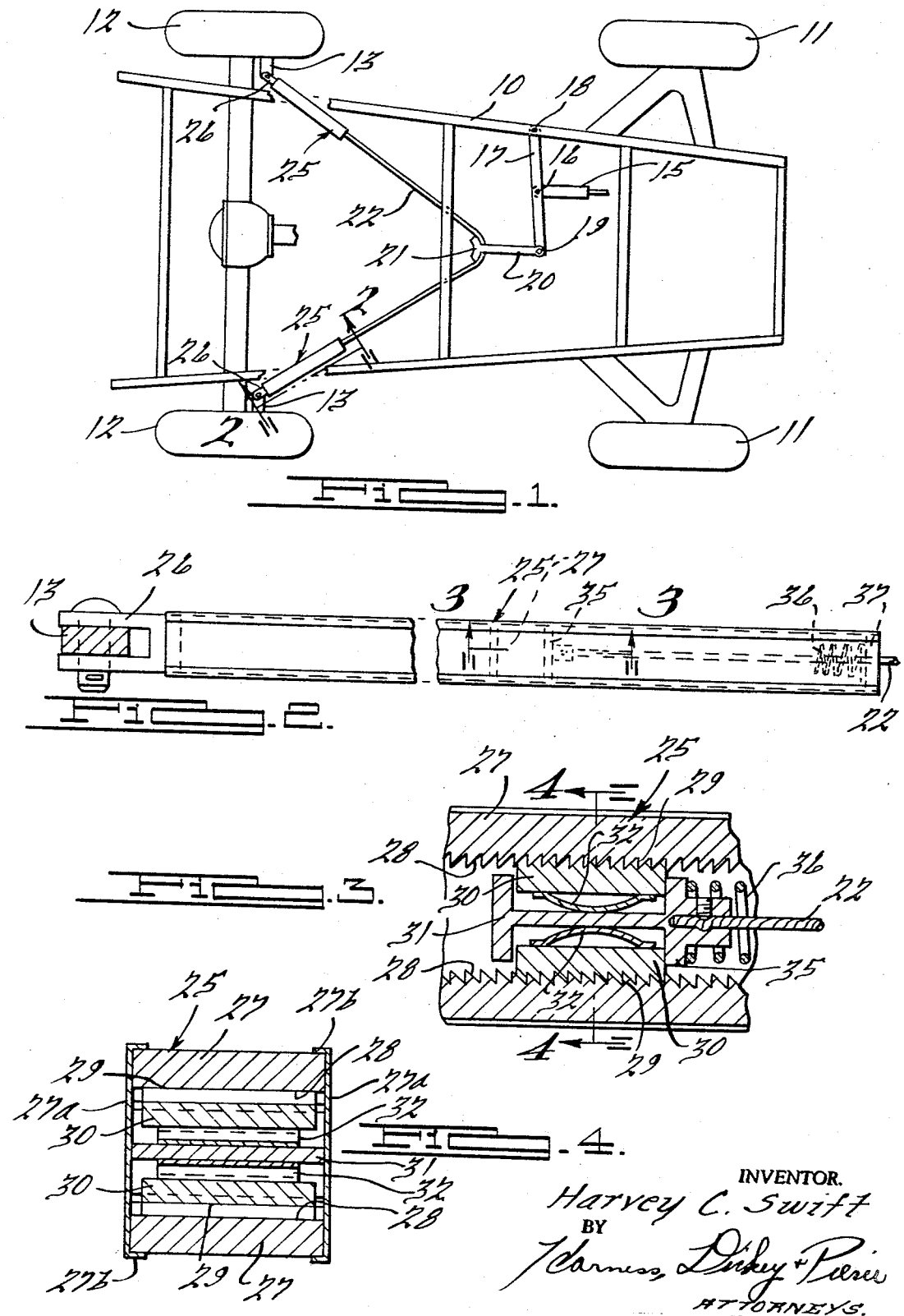
INVENTOR.
Harvey C. Swift
BY
Harness, Dickey & Pierce
ATTORNEYS.

United States Patent Office 3,333,660
Patented Aug. 1, 1967

3,333,660
PARKING BRAKE WITH AUTOMATIC
ADJUSTER
Harvey C. Swift, Birmingham, Mich., assignor to Kelsey-Hayes Company, Romulus, Mich., a corporation of Delaware
Filed Mar. 21, 1966, Ser. No. 535,936
5 Claims. (Cl. 188—196)

This invention relates to brakes and more particularly to a mechanically operated brake particularly adapted for use on motor vehicles and the like.

One of the objects of this invention is to provide a brake of this type provided with means for automatically adjusting the brake shoes controlled by excessive movement of the brake shoes due to wear on the linings thereof.

Another object of this invention is to provide a mechanically operated brake including a brake actuating cable and means for automatically adjusting the effective length of the cable to compensate for wear on the brake shoe linings.

A still further object of this invention is to provide a brake actuating mechanism of this type wherein its structural simplicity produces a substantial economy in its manufacturing, installation and maintenance costs.

The various objects and advantages, and the novel details of construction of one commercially practical embodiment of the invention, will become more apparent as this description proceeds, especially when considered in connection with the accompanying drawings, in which:

FIGURE 1 is a semi-diagrammatic plan view of a vehicle chassis showing the brake actuating mechanism applied thereto;

FIGURE 2 is an enlarged sectional elevational view of the extensible member forming a part of the invention, taken substantially on the plane indicated by line 2—2 in FIGURE 1;

FIGURE 3 is a still further enlarged view taken substantially on the plane indicated by line 3—3 in FIGURE 2; and FIGURE 4 is a sectional view taken substantially on the plane indicated by line 4—4 in FIGURE 3, looking in the direction of the arrows.

The invention of this application is illustrated in FIGURE 1 of the drawing as associated with an automotive vehicle chassis frame 10 providing front steering wheels 11 and rear wheels 12. Each of the rear wheels 12 is provided with a brake mechanism (not shown) which comprises the customary brake shoes which are actuated by brake actuating levers 13. By moving the brake actuating levers 13 the brake shoes are applied in a manner well known in this art.

The present invention relates more particularly to means for manually actuating the brake shoes for the rear brakes so that these brakes may be employed as a parking or emergency brake. In the embodiment shown in FIGURE 1 the rear brakes of the vehicle are applied, usually by means of a brake pedal actuating lever 15 pivotally connected as at 16 to lever 17 pivotally connected at one end, as at 18 to the chassis frame 10. The other end of lever 17 is pivotally connected as at 19 to a lever member 20 having a saddle portion engaging a flexible brake actuating cable 22.

The reference character 25 indicates generally an automatic cable adjusting member adapted automatically to take up any slack in the cable 22 as the brake shoes (not shown) become worn. Each adjusting member 25 is pivotally connected as by means of a clevis to brake actuating lever 13.

Each of the members 25 is substantially tubular and comprises a pair of longitudinally extending spaced side members 27 each provided with a set or series of inwardly extending abrupt teeth 28. The reference character 27a indicates the other two sides of the member 25 which may be formed of sheet metal secured to the side members 27 by flanges 27b. The abrupt faces of the teeth 28 face toward the right as shown in FIGURE 3 so as to engage the abrupt faces of similar teeth 29 formed on a pair of segments 30. These segments 30 are slidably mounted in an arbor member 31 and are urged radially outwardly by leaf springs 32 arranged between the segments 30 and the arbor member 31. With this arrangement the teeth of the segments 30 will engage the teeth 28 on the side members 27 of the adjusting member 25 to which a pulling force is applied through cable 22 to apply the brakes. However, the segments 30 are movable relative to the teeth 28 on the side member 27 to take up any slack in the cable 22.

The right hand end of the arbor member 31 is provided with a flanged member 35 forming an abutment for the end of a compression spring 36 the other end of which engages an abutment 37 secured to the right hand end of the member 25. This spring 36 tends to move the segments 30 to the left as viewed in FIGURE 3 and when there has been sufficient wear on the brake shoes (not shown) the springs 36 to act to move the segments 30 one tooth space to the left as viewed in FIGURE 3 whereupon to take up any slack in the actuating cable 22.

With the foregoing construction the brakes are applied by pulling force exerted on the cable 22. During this operation the abrupt faces of the inter-engaging teeth 28 and 29 will engage one another. As the brake shoes become worn the springs 36 will move the segments 30 one or more tooth spaces to the left as viewed in FIGURE 3 to take up any slack in the brake operating cable 22.

While one commercially practical embodiment of the invention has been described and illustrated herein somewhat in detail, it will be understood that various changes may be made as may come within the purview of the accompanying claims.

What is claimed is:

1. An actuating device for vehicle brakes comprising, a sleeve-like member connected adjacent one end to the brake, and provided with interiorly arranged abutment teeth, one or more spring pressed segments within said sleeve-like member provided with similar teeth engaging the teeth aforesaid, a flexible brake actuating member connected to said spring pressed segments and spring means for relatively moving said sleeve-like member and segments to take up any slack occurring in said brake actuating member.

2. A device as described in claim 1 in which said spring means is arranged within said sleeve-like member.

3. A device as described in claim 1 in which the inter-engaging abutment teeth on the interior of said sleeve-like member and on the exterior of said segments permit relative movement between said parts in one direction only.

4. A device as described in claim 1 in which the inter-engaging abutment teeth on said sleeve-like member and said segments permit relative movement between said parts in one direction to take up slack in said flexible brake actuating member, and a compression spring in said sleeve-like member for relatively moving said sleeve-like member and segments.

5. A device as described in claim 1 in which one of said brake actuating devices is associated with each rear wheel, a single flexible actuating member is employed with its ends connected respectively to said actuating devices, and a single brake actuating lever is connected to said flexible member to simultaneously actuate both brakes.

References Cited

UNITED STATES PATENTS 2,527,156  10/1950  Schuster.
2,918,991  12/1959  Reisch _____ 188—196

DUANE A. REGER, *Primary Examiner.*